Patented Apr. 17, 1951

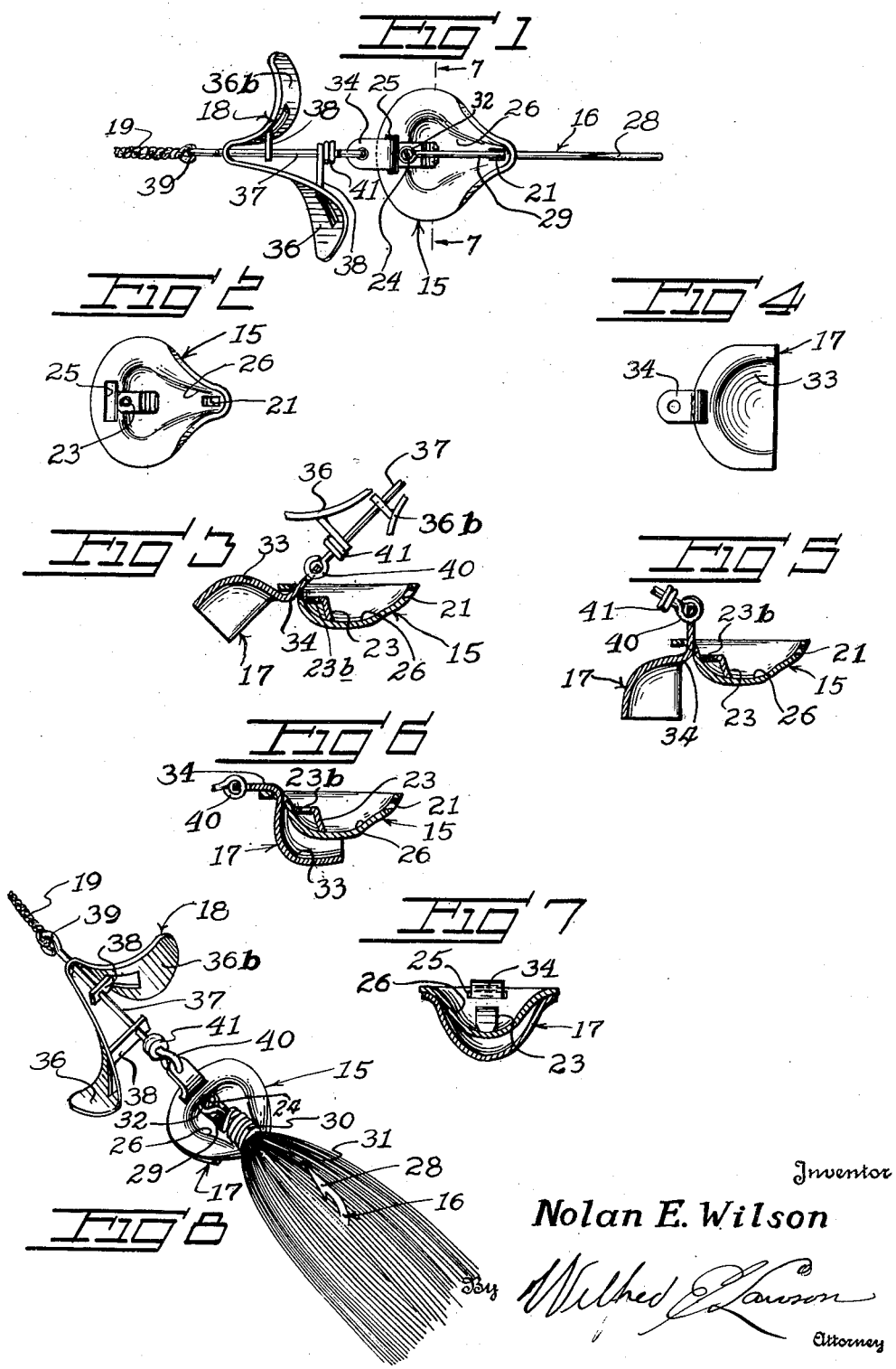

2,549,354

UNITED STATES PATENT OFFICE 2,549,354

FISH LURE

Nolan E. Wilson, Homer, La.

Application October 21, 1946, Serial No. 704,697

5 Claims. (Cl. 43—42.31)

This invention relates to a fish lure designed to make a distinctive noise or sound when pulled through the water.

A principal object of the present invention is to provide a novel lure designed to produce a distinctive sound when cast and when drawn through the water comprising a main body portion in the form of a heart shaped shell to which the hook is attached, said shell having a concave upper surface and a convex underside, and an underlying cup portion having an open top designed to fit against the convex under side of the shell and open at its rear whereby to produce the desired distinctive sounds when the lure is drawn through the water.

Another object of the invention is to provide a lure of the character described wherein the shell and cup bodies are hingedly coupled together so that various distinctive sounds will be made by the two members at different times between the period of casting the lure and the drawing of the lure through the water, the cup body being provided with means to facilitate the attachment of the fishing line thereto while the shell body has the fish hook attached thereto.

Another object of the invention is to provide a fishing lure of the character described wherein the cup body has a top edge formation which generally conforms to the contour of a part of the under side of the shell body whereby when the lure is being drawn through the water the cup will position itself closely against the concave under side of the shell and the rear part of the cup which is open will function to produce the desired distinctive sounds and also a stream of bubbles which will assist in enticing an attack upon the lure on the part of the fish.

One embodiment of the invention is illustrated in the accompanying drawing wherein like numerals correspond to similar or like parts in the different views. The invention will be readily understood upon reference to the following description taken in association with the accompanying drawing.

In the drawing:

Figure 1 is an assembly view in top plan of the complete fish lure with the sound making cup positioned under the shell body.

Figure 2 is a top plan view of the shell body alone.

Figure 3 is a longitudinal section of the cup and shell showing the position of the same after casting and when the fish line is slack.

Figure 4 is a top plan view of the sound making cup alone.

Figure 5 is a section similar to Figure 3 but showing positions assumed by the cup and shell as the line is gradually tightened.

Figure 6 is a view in longitudinal section showing the cup closed fully against the under side of the shell as when the lure is being pulled by the fish line through the water.

Figure 7 is a transverse section through the body and cup taken substantially on the line 8—8 of Figure 1.

Figure 8 is a perspective view of the complete fish lure with the usual hook shielding hairs attached and the parts in the relative position assumed by the lure as the same is drawn through the water.

The fish lure of the present invention comprises the following main parts, namely, a hollow shell or body 15; a hook 16 and buck tail 31, rigidly attached thereto; a sound producing cup 17, hingedly attached to the shell, said cup having an open top and an open rear end and a spinner 18 forming a revolvable connection between the cup 17 and the rear end of the fish line 19. The shell or body as seen from the top in Figures 1 and 2 has a substantially heart shaped contour tapering to the rear, with a deep depression 26 in the middle. At the rear of the depression at the longitudinal center of the body is a narrow slot 21 for receiving the shank and eye 32 of the hook 16, when the device is assembled. At 23 is shown a raised step with a threaded hole 23b for a screw 24 to rigidly secure the hook 16 to the shell 15. In addition, the forward, larger end of the shell 15 is provided with a transverse slot 25, the function of which will be later described.

The hook 16 may be of any suitable type having a barbed point 28 which can be passed through the slot 21 in the smaller end of shell 15 from inside so as to project from the bottom rear end of the shell, while the forward portion of the shank 29, having an eye 32 with the reinforcement collar 30 remains in the depression of the shell. This collar 30 which may consist of solder, shellac or other similar material, secures to the hook shank a tail 31 which may be formed from horse hair, goat's hair or buck tail hair. Since the collar 30 with the tail 31 is carried from the inside of the shell and the barbed hook end 28 penetrates from the under side of the same, it will be clear that the tail substantially conceals the barbed hook end 28.

The sound making cup 17 is shorter than the shell 15, but of substantially the same cross section, as shown in Figure 8, and has a downward bulge 33, so that is fits under the shell depression 26 when closed and, being opened rearwardly, causes a distinctive sound when the lure is drawn through the water due to the tendency to produce a water free space within the cup.

The cup 17 has a forward tongue 34 which extends loosely through the transverse slot in the shell and accordingly loosely couples or hinges the shell and cup together.

By finishing the inside of the cup 17 one color and the outside another color, a changeable coloration will result as the fish will see one color when the cup is closed and another color when the cup is opened.

The spinner 18 consists of a pair of radially projecting, backwardly curved wings 36, 36b substantially opposite to each other and being made in one piece. A central hole has extended therethrough a spindle 37 and, as is clearly shown in Figures 1 and 8, one wing, here shown as the wing 36b is shorter than the other wing, designated 36. Each of the wings 36, 36b has cut therefrom the inwardly bent finger 38. Each of these fingers has a bearing hole which is aligned with the hole between the wings and has the spindle 37 extended therethrough. The fingers not only serve as extra bearings but also brace the wings or blades and prevent them from bending. Accordingly it will be readily apparent that the wings have free whirling motion on the spindle which causes eccentric movement of the lure because of the curvature of the wings and the different lengths of the same.

The forward end of the spindle 37 has an eye 39 for the attachment of a fish line 19 thereto and another eye or snap hook 40 is provided at the rear end of the spindle for releasable connection with the tongue 34 of the cup 17. On the spindle 37 may also be carried one or more freely fitting washers or beads 41 which will assure free rotary movement of the spinner wings on the spindle.

It will be readily apparent upon reference to Figures 1, 3, 5, 6 and 8, that a pull on the line 19 will not be communicated directed to the hook 16 but through the spindle 37 to the tongue 34 of the cup 17 which, being hinged to the shell, will not communicate the pull to the hook until the fish line is drawn taut as shown in Figures 1, 6 and 8. Otherwise there will occur with a slack line, flappings, see Figures 3 and 5, between the shell 15 and the cup 17. The cup when drawn close under the shell will produce a distinctive sound from the passing water, which is found effective to attract the fish, the changing colors of the lure also contributing to the attainment of the desired results.

The pull on the fish line will not interfere with the free action of the spinner 18, since the pull is carried through the spindle 37 to the trailing portion of the lure.

The shell 15 and the cup 17 may be of the same or different thin and suitably rigid or stiff materials such, for example, as brass, aluminum, steel or other metal or plastic and the like and may be colored in one or more shades.

Referring particularly to Figure 3, the sound producing cup 17 is shown in fully opened position. The lure assumes this open position in the cast and remains so when it strikes water.

Figures 3 and 5 show the various positions which the cup assumes in the act of closing. This causes the flapping action which gives the lure its likelike motion in the water and is controlled by the operator by tightening or slackening the line.

Figures 6 and 8 show the cup 17 in closed position. It is when the cup is in this position that the distinctive sound is produced and this is accompanied by a stream of bubbles.

The several views show the various positions of the sound producing cup and illustrate the advantage of the lure being finished in at least two colors, so that the fish can see the color changes which take place when the lure is in motion.

It is to be understood that the invention as herein disclosed may be varied from the details described and shown so long as such variations do not depart from the spirit of the subjoined claims.

I claim:

1. A sound producing lure, comprising a substantially heart shaped body centrally depressed to have a shell formed with a concave upper side and convex underside, the body having a slot therein at the larger end thereof and a second slot formed in the body at the smaller end, a second body in the form of an open top cup having an open rear end, the open top of the cup being designed to fit the convex underside of the shell body, a tongue integral with the cup at the end remote from the open side thereof and extended loosely through the first mentioned slot whereby the cup and shell are loosely hingedly coupled together, a fish hook having a shank portion extending through the second mentioned slot and means for attaching the shank of the hook to the shell body at a point adjacent to the first mentioned slot, and means for attaching a line to said tongue.

2. A sound producing lure of the character described in claim 1, wherein the said means for attaching the shank of the hook to the shell body comprises a member secured within the depressed portion of the shell body immediately rearwardly of the second mentioned slot, the hook shank having an eye disposed over said member, and a removable fastener passing through said eye into said member.

3. A sound producing fish lure comprising a fish hook, a body to which said hook is rigidly secured, an open top cup, a hinged connection between the body and the cup intermediate the ends of the latter, and a line attaching means connected to the forward end of the cup whereby the rear portion of the cup may move to a position below and in contact with the underside of the body, said hinge connection permitting free movement between the cup and the under side of the body.

4. A fish lure as described in claim 3, in which said body has a central depression adapted to fit into the open top of said cup.

5. A fish lure as described in claim 3, in which said body has a central depression adapted to fit into the open top of said cup, said hinge connection consisting of a tongue integral with the cup, said body having a slot through which said tongue loosely extends, the tongue having said line attaching means connected therewith.

NOLAN E. WILSON.

REFERENCES CITED

The following references are of record in the file of this patent:

UNITED STATES PATENTS

| Number | Name | Date |
|---|---|---|
| 468,361 | Pflueger | Feb. 9, 1892 |
| 1,339,189 | Frensdorf | May 4, 1920 |
| 1,418,229 | Buddle | May 30, 1922 |
| 1,627,637 | Dahlquist | May 10, 1927 |
| 1,830,080 | Allen | Nov. 3, 1931 |
| 2,086,008 | Turner | July 6, 1937 |
| 2,238,604 | Sabin | Apr. 15, 1941 |
| 2,265,482 | Hearn | Dec. 9, 1941 |